United States Patent [19]

Hanson

[11] Patent Number: 4,722,992
[45] Date of Patent: * Feb. 2, 1988

[54] INJECTION MOLDABLE POLYMER COMPRISING PHTHALIC ANHYDRIDE, ANILINE AND TRIMELLITIC ANHYDRIDE MOIETIES

[75] Inventor: Robert B. Hanson, Oswego, Ill.

[73] Assignee: Standard Oil Company, Chicago, Ill.

[*] Notice: The portion of the term of this patent subsequent to May 15, 2001 has been disclaimed.

[21] Appl. No.: 743,176

[22] Filed: Jun. 10, 1985

Related U.S. Application Data

[63] Continuation of Ser. No. 609,472, May 11, 1984, abandoned, which is a continuation-in-part of Ser. No. 406,110, Aug. 6, 1982, Pat. No. 4,448,925.

[51] Int. Cl.[4] ............................................. C08G 73/14
[52] U.S. Cl. .................................. 528/172; 524/600; 524/606; 524/726; 528/125; 528/126; 528/128; 528/185; 528/188; 528/189; 528/220; 528/229; 528/342; 528/350; 528/353
[58] Field of Search ............... 528/125, 126, 128, 172, 528/185, 188, 189, 220, 229, 342, 353, 350; 524/600, 606, 726

[56] References Cited

U.S. PATENT DOCUMENTS

| | | | |
|---|---|---|---|
| 3,347,828 | 10/1967 | Stephens et al. | 528/188 |
| 3,444,183 | 5/1969 | Hubbuch | 524/233 |
| 3,494,890 | 2/1970 | Morello | 528/179 |
| 3,573,260 | 3/1971 | Morello | 528/188 |
| 3,661,832 | 5/1972 | Stephens | 528/352 |
| 4,016,140 | 4/1977 | Morello | 528/188 |
| 4,118,364 | 10/1978 | Nielinger et al. | 524/404 |
| 4,136,085 | 1/1979 | Hanson | 528/189 |
| 4,224,214 | 9/1980 | Chen | 524/423 |
| 4,309,528 | 1/1982 | Keske et al. | 528/189 |
| 4,313,868 | 2/1982 | Hanson | 528/188 |
| 4,448,925 | 5/1984 | Hanson | 524/600 |

Primary Examiner—Harold D. Anderson
Attorney, Agent, or Firm—Stephen L. Hensley; William H. Magidson; Ralph C. Medhurst

[57] ABSTRACT

Novel polymers and molding compositions are prepared from acyl halide derivatives of tricarboxylic acids and diamines and about 1 to about 10 percent by weight of phthalic anhydride, or trimellitic anhydride or aniline moieties. The polymers are useful in engineering plastics.

16 Claims, No Drawings

INJECTION MOLDABLE POLYMER COMPRISING PHTHALIC ANHYDRIDE, ANILINE AND TRIMELLITIC ANHYDRIDE MOIETIES

This is a continuation of application Ser. No. 609,472, filed May 11, 1984 now abandoned, which in turn is a continuation-in-part of Ser. No. 406,110 filed Aug. 6, 1982, now U.S. Pat. No. 4,448,925.

FIELD OF THE INVENTION

The field of this inventon relates to glass-filled polyamide-imide phthalamide copolymers containing about 1 to about 10 percent phthalic anhydride, aniline or trimellitic anhydride or a mixture of these prepared in an organic solvent, and to molding powders and molded articles prepared therefrom.

BACKGROUND

Amide-imide polymers are a relatively new class of organic compounds known for their solubility in nitrogen-containing organic solvents when in the largely polyamide form. The major application of the amide-imide polymers has been as wire enamels. This is illustrated in U.S. Pat. Nos. 3,661,832 (1972), 3,494,890 (1970); and 3,347,828 (1967).

Compositions prepared from isophthalic acid and diamines and aliphatic diamines have found application in coatings and films. The prior art on this is summarized in U.S. Pat. No. 3,444,183 (1969).

Reinforced polyhexamethylene isophthalamides have been used to produce articles as disclosed in U.S. Pat. No. 4,118,364 (1978). However, the physical properties of these reinforced polyhexamethylene isophthalamides are insufficient for use in engineering plastics since their tensile strength and the continuous service temperature do not meet those required for engineering plastics.

U.S. Pat. No. 4,313,868, discloses copolymers and molding compositions prepared from acylhalide derivatives of dicarboxylic acids, acylhalides or tricarboxylic aromatic anhydrides and aromatic diamines. That reference also discloses glass-filled copolymers. These products, useful as engineering plastics, have a tendency to have flow problems. These problems are overcome when about 1 to about 10 percent phthalic anhydride, aniline or trimellitic anhydride or a mixture of these is added to the polymer.

U.S. Pat. No. 4,136,085 discloses that the addition of phthalic anhydride to compositions based on the acylhalide derivative of trimellitic anhydride and diamines did not improve the flow properties of the polymer. Applicant has discovered that when phthalic anhydride, aniline, trimellitic anhydride or a mixture of these is added to his polymer, the flow is greatly improved.

The general object of this invention is to provide amide-imide and polyamide copolymers comprising about 1 to about 10 percent phthalic anhydride moieties, aniline moieties, trimellitic anhydride moieties or a mixture of these. A more specific object of this invention is to provide amide-imide and polyamide copolymers comprising about 1 to about 10 percent phthalic anhydride, aniline, trimellitic anhydride or a mixture of these reinforced with glass fibers, glass beads and mixtures thereof. Another object of this invention is to provide a process for incorporating 1 to about 10 percent phthalic anhydride aniline trimellitic anhydride or a mixture of these into polyamide-imide polyamide copolymers. Another object is to provide amide-imide and amide polymers prepared from aromatic diamines such as 2,2-bis[4(p-aminophenoxy)phenyl]propane, bis[4-(p-aminophenoxy)phenyl]sulfone, phenylene diamine, m-toluene diamine, neopentene diamine and 2,2,2, trimethylhexamethylene diamine or a mixture of these diamines, and mixtures of an acylhalide derivative of an aromatic tricarboxylic anhydride and about 1 to about 10 percent phthalic anhydride, aniline, trimellitic anhydride or a mixture of these wherein said polymer contains from about 30 to about 60 weight percent glass fibers, glass beads, or mixtures of these. Other objects appear hereinafter.

I have now found that improved amide-imide amide copolymers can be obtained by reacting acylhalide derivatives of benzene tricarboxylic anhydride and with aromatic diamines and about 1 to about 10 percent phthalic anhydride, aniline, trimellitic anhydride or a mixture of these. I have also discovered that these polymers comprising about 1 to about 10 percent phthalic anhydride, aniline, trimellitic anhydride or a mixture of these can be filled with from about 30 to about 60 weight percent with glass fibers, glass beads, or a mixture thereof. Suitably, the aforementioned molding compositions may contain from about 30 to about 50 weight percent of glass fibers, glass beads, or a mixture thereof. Our studies have shown that if the teachings of U.S. Pat. No. 4,313,868 are followed specifically in Example 2, great care must be taken in processing this trimellitic anhydride capped resin, as heat treatment of the polymer at about 450° to about 470° F. for periods greater than two hours will yield material having a zero melt flow at 650° F., ⅛ inch die and 5,000 psi. Pelletization and injection molding of the polymer will yield greater cavity pressure and injection molding cycle times are less than 40 seconds. Injection molding of the polyamide-imide amide polymer with about 1 to about 10 percent by weight phthalic anhydride in place of the 2 percent trimellitic acid used in Example 2 of U.S. Pat. No. 4,313,868 shows a substantial improvement in the melt flow values and stability of the polymer. Compositions comprising up to 60 percent by weight glass fiber show an improvement in cavity pressure and injection molding cycle when the polymer comprises about 1 to about 10 percent phthalic anhydride compared to polymers not having any phthalic anhydride moieties.

Our studies have shown that fully aromatic amide-imide polymers are very expensive and need special injection molding equipment capable of withstanding injection molding temperatures in the range of 600° to 700° F. at the molding pressure in excess of 20,000 pounds per square inch. Our novel amide-imide amide copolymer comprising about 1 to about 10 percent phthalic anhydride, trimellitic anhydride, aniline or a mixture of these and glass-filled copolymers are much more economical than conventional polyamide-imide copolymers disclosed in U.S. Pat. Nos. 4,016,140 (1977) and 3,573,260 (1971) and yet retain the same thermal and mechanical properties of the copolymers disclosed in the aforementioned patents. This is a significant advance in the art and is wholly unexpected.

The use of polyamide-imide polymers as engineering plastics has been limited only by their relatively high cost. Thus, when the inherent cost can be brought down, the commercial application of these polymers will be greatly expanded. The copolymers of this invention have large cost advantages over the prior art compositions and thus promise to expand the commercial applications of these polymers.

The copolymers of this invention are prepared by reacting a mixture of an acyl halide derivative of an aromatic tricarboxylic acid anhydride with aromatic or a mixture of aromatic and aliphatic diamines.

The polyamide-imides are prepared by reacting an acyl halide derivative of an aromatic tricarboxylic acid anhydride with one or a mixture of largely- or wholly-aromatic primary diamines. The resulting products are polyamides wherein the linking groups are predominantly amide groups, although some may be imide groups, and wherein the structure contains free carboxylic acid groups which are capable of further reaction. Such polyamides are moderate molecular weight (7–13,000 as prepared) polymeric compounds having, in their molecule, units of:

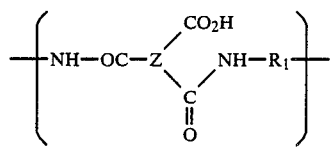

and units of:

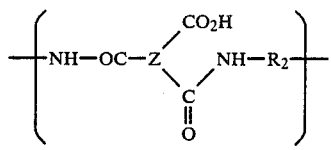

and, optionally, units of:

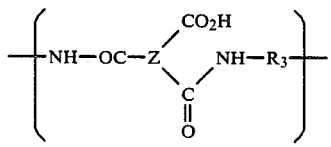

wherein the free carboxyl groups are ortho to one amide group, Z is an aromaic moiety containing 1 to 4 benzene rings or lower-alkyl-substituted benzene rings; $R_1$, $R_2$ and $R_3$ are the same for homopolymers and are different for copolymers and are divalent aromatic or aliphatic hydrocarbon radicals. These hydrocarbon radicals may be a divalent aromatic or aliphatic hydrocarbon radical of from 6 to about 10 carbon atoms, or two divalent aromatic hydrocarbon radicals each of from 6 to about 10 carbon atoms joined directly or by stable linkages such as —O—, methylene, —CO—, —SO$_2$—, —S—; for example, —R'—O—R'—, —R'—CH$_2$—R'—, —R'—CO—R'—, —R'—SO$_2$—R'— and —R'—S—R'—.

Said polyamides are capable of substantially complete imidization by heating, by which they form the polyamide-imide structure having, to a substantial extent, recurring units of:

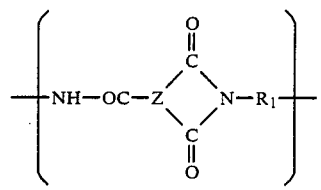

and units of:

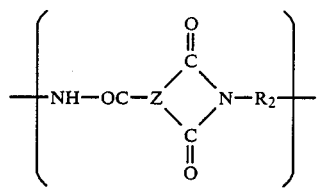

and, optionally, units of:

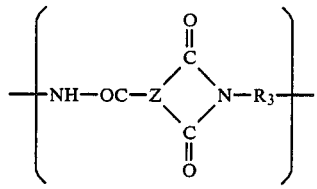

wherein one carbonyl group is meta to and one carbonyl group is para to each amide group and wherein Z, $R_1$, $R_2$ and $R_3$ are defined as above. Typical copolymers of this invention have up to about 50 percent imidization prior to heat treatment, typically about 10 to about 40 percent.

We can use a single diamine but, usefully, the mixture of diamines contains two or more, preferably two or three, wholly- or largely-aromatic primary diamines. More particularly, they are wholly- or largely-aromatic primary diamines containing from 6 to about 10 carbon atoms or wholly- or largely-aromatic primary diamines composed of two divalent aromatic moieties of from 6 to about 10 carbon atoms, each moiety containing one primary amine group, and the moieties linked directly or through, for example, a bridging —O—, —S—, —SO$_2$—, —CO—, or methylene group.

Preferably, the mixture of primary aromatic diamines comprises 2,2-bis[4-(p-aminophenoxy)phenyl]propane, bis[4-(p-aminophenoxy)phenyl]sulfone a mixture of these or in combination with diamines such as m-phenylene diamine, neopentane diamine, trimethylhexamethylene diamine and the like. The preferred diamines for homo- and copolymers have the following formulae: 2,2-bis[4-(p-aminophenoxy)phenyl]propane hereinafter referred to as BAPP

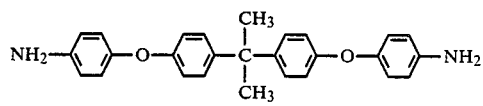

and bis[4-(p-aminophenoxy)phenyl]sulfone hereinafter referred to as BAPS.

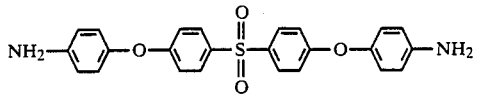

In the one-component system, the preferred diamines are oxybis(aniline) or meta-phenylenediamine. The aromatic nature of the diamines provides the excellent thermal properties of the copolymers while the primary amine groups permit the desired imide rings and amide linkages to be formed.

Usually, the polymerization or copolymerization is carried out in the presence of a nitrogen-containing organic polar solvent such as N-methylpyrrolidone, N,N-dimethylformamide and N,N-dimethylacetamide. The reaction should be carried out under substantially anhydrous conditions and at a temperature below about 150° C. Most advantageously, the reaction is carried out from about 20° C. to about 50° C.

The reaction time is not critical and depends primarily on the reaction temperature. It may vary from about 1 to about 24 hours, with about 2 to 4 hours at about 30° C. to about 50° C. preferred for the nitrogen-containing solvents.

I have found that the polyamide-imide amide copolymers are improved by the addition of reinforcing material; particularly the mechanical properties of the copolymers are improved if these copolymers contain from 30 to 60 percent by weight glass fibers, glass beads or a mixture thereof. In the preferred range, the copolymers contain 30 to 40 percent by weight of the glass reinforcing material, glass fibers, glass beads, or a mixture thereof. Suitable reinforcing materials can be glass fibers, glass beads, glass spheres, or glass fabric. The glass fibers are made of alkali-free boron-silicate glass (E-glass) or alkali-containing C-glass. The thickness of the fibers is preferably, on average, between 3 um and 30 um. It is possible to use both long fibers with an average length of from 5 to 50 mm and also short fibers with an average filament length of from 0.05 to 5 mm. In principle, any standard commercial-grade fibers, especially glass fibers, may be used. Glass beads ranging from 5 um to 50 um in diameter may also be used as reinforcing material.

The reinforced polyamide-imide amide copolymers may be prepared in various ways. For example, so-called rovings endless-glass fiber strands, are coated with the polyamide melt and subsequently granulated. The cut fibers or the glass beads may also be mixed with granulated polyamide and the resulting mixture melted in a conventional extruder, or alternatively the fibers may be directly introduced into the polyamide melt through a suitable inlet in the extruder.

Injection molding of the novel glass-filled polymer is accomplished by injecting the copolymer into a mold maintained at a temperature of about 300° to 450° F. In this process a 25 to 28 second cycle is used with a barrel temperature of about 600° to 650° F. The injection molding conditions are given in Table I.

TABLE 1

| Mold Temperature | 350° F. to 450° F. |
| --- | --- |
| Injection Pressure | 15,000 to 19,000 psi and held for 1 to 3 seconds |
| Back Pressure | 100 to 220 psi |
| Cycle Time | 25 to 28 seconds |
| Extruder: | |
| Nozzle Temperature | 600° F. to 630° F. |

TABLE 1-continued

| Barrels: | |
| --- | --- |
| Front heated to | 600° F. to 630° F. |
| Screw: | |
| 20 to 25 revolutions/minute | |

Cavity pressure measurements are used as quality control checks of polyamide-imide resin viscosity. Pressure buildup during the filling of an injection molded part is measured at a point in the cavity (ejector pin). This is accomplished by placing a pressure transducer behind the ejector pin and recording the pressure with a chart recorder or other readout device. Cavity pressure normally rises as the mold is being filled and peaks as the molten resin is packed into the cavity. As the resin solidifies, cavity pressure decreases.

We have found that resins that have low cavity pressures process poorly and that spiral flow measurements were not sensitive enough to discriminate between resins in the viscosity range of interest. Low cavity pressures indicate a large pressure drop between injection and cavity pressures. This indicates higher resin viscosities. In the same manner, high cavity pressures indicate less pressure change between injection and cavity pressures, suggesting lower resin viscosities.

Amide-imide polymer and copolymer viscosities had been measured by spiral flow determinations previous to the implementation of the cavity pressure procedure, see U.S. Pat. No. 4,224,214. Cavity pressure was selected over spiral flow because of its greater sensitivity. The cavity pressure test has been implemented as an amide-imide homopolymer and copolymer quality control procedure. Like spiral flow, cavity pressure is a test that can be done conveniently in a molder's shop.

Resins were dried in a vacuum (2 mm Hg) oven at 300° F. for at least 16 hours before testing. Moisture in amide-imide homopolymer copolymers has a very significant effect on its flow properties, therefore special care was taken to be sure the samples were properly dried. This drying procedure was used before making flow rate and cavity pressure measurements.

The flow rate procedure was patterned after the standard method described in ASTM D1238. I used a 335° C. (635° F.) barrel temperature with a 30 minute preheat time. This is about the largest set of weights that can be used safely with the standard extrusion plastometer apparatus. I used a standad 0.0825 in. diameter, and a 0.315 in. long orifice.

Special care was taken to be sure that each flow rate measurement was started when an equivalent volume of resin was in the barrel. Previous rheology work indicated that there is a very large "barrel height" effect on amide-imide homopolymers and copolymers. Each flow rate measurement was initiated while the top of the piston collar was between the two scribe marks on the piston. This precaution is also required by ASTM in method D1238.

In a preferred embodiment, 1 mole meta-phenylenediamine is dissolved in a nitrogen-containing solvent such as dimethylacetamide or N-methylpyrolidone and about 1 to about 10 percent by weight phthalic anhydride is added. A mixture of the 4-acid chloride of trimellitic anhydride and the acid chloride form of isophthalic acid in a molar ratio of 1 to 1 is added to the diamine solution over two hours at about 25°–35° C. The isophthalic anhydride and the 4-acid chloride of trimellitic anhydride may be either dry blended or molten. The viscous solution is then heated at about 50° C. for one hour and the polymer is recovered by precipitation into water. The product is washed thoroughly and dried to a solids content in excess of 96%. The polymer is then dry blended with glass fiber, pelletized and injection molded under molding conditions as set forth in Table I. The mechanical properties of the copolymer are given in Tables 2, 3, and 4. The following Examples illustrate the preferred embodiments of this invention. It will be understood that these Examples are for illustrative purposes only and do not purport to be wholly definitive with respect to the conditions or scope of the invention.

EXAMPLE 1

A 1000-ml roundbottom, 3-necked flask equipped with a saddle stirrer, nitrogen inlet and thermometer was charged with 102.6 parts by weight (pbw) of BAPP, 0.96 pbw of trimellitic anhydride (TMA) and 398.8 pbw of N-methylpyrrolidone. After solution had occurred under a nitrogen purge, 51.6 pbw of 4-trimellitoyl anhydride chloride (4-TMAC) was added over 1.5 hours keeping the temperature below 35° C. The resulting viscous solution was brought to 50° C. When the Gardner viscosity had reached a Z5-(−) viscosity the solution was precipitated by pouring into a Waring blender containing 1000 ml of deionized water. The polymer product was washed five times with deionized water followed by air drying on a filter, heat treatment for 16 hours at 80°–90° C. (22 mm hg), and finally heating for six hours at 400°–450° F. The results of this Experiment are set forth in Tables 2-4.

EXAMPLE 2

This example is the same as Example 1 except that 1.92 pbw of TMA were added as the capping agent, and 50.5 pbw of a 4-TMAC were used. The results of this experiment are set forth in Tables 2-4.

EXAMPLE 3

A 1000-ml roundbottom, 3-necked flask equipped with a saddle stirrer, nitrogen inlet and thermometer was charged with 102.6 pbw of BAPP, 0.37 pbw of phthalic anhydride (PA) and 398.8 pbw of N-methylpyrrolidone. After solution had occurred under a nitrogen purge, 52.1 pbw of 4-TMAC were added over 1.5 hours keeping the temperature below 35° C. The resulting viscous solution was brought to 50° C. When the Gardner viscosity had reached a Z5-(−) viscosity the solution was precipitated by pouring into a Waring blender containing 1000 ml of deionized water. The polymer product was washed five times with deionized water followed by air-drying on a filter, heat treatment for 16 hours at 80°–90° C. (22 mm hg), and finally heating for six hours at 400°–450° F. The results of this experiment are set forth in Tables 2-4.

EXAMPLE 4

The example is the same as Example 3 except that 1.11 pbw of PA were added as the capping agent, and 51.06 pbw of 4-TMAC were used. The results of this experiment are set forth in Tables 2-4.

EXAMPLE 5

This example is the same as Example 3 except that 2.23 pbw of PA were added as the capping agent, and 49.5 pbw of 4-TMAC were used. The results of this experiment are set forth in Tables 2-4.

EXAMPLE 6

This example is the same as Example 1 except that 3.38 pbw of TMA were added as the capping agent, and 48.9 pbw of 4-TMAC were used. The results of this experiment are set forth in Tables 2-4.

EXAMPLE 7

A 1000-ml roundbottom, 3-necked flask equipped with a saddle-stirrer, nitrogen inlet and thermometer was charged with 636.9 pbw of N-methylpyrrolidone, 173.6 pbw of BAPP and 1.2 pbw of aniline was added. After solution had occurred under a nitrogen purge, 9.18 pbw of 4-TMAC was added over 1.5 hours keeping the temperature below 35° C. The resulting viscous solution was brought to 50° C. When the Gardner viscosity had reached a Z5(−) viscosity the solution was precipitated by pouring into a Waring blender containing 1000 ml of deionized water. The polymer product was washed five times with deionized water followed by air-drying on a filter, heat treatment for 16 hours at 80°–90° C. (22 mm hg), and finally heating for six hours at 400°–450° F. The results of this Experiment are set forth in Tables 2-4.

EXAMPLE 8

This example is the same as Example 3 except that 3.73 pbw of PA were added as the capping agent, and 47.3 pbw of 4-TMAC were used. The results of this experiment are set forth in Tables 2-4.

EXAMPLE 9

This example is the same as Example 7 except that 2.38 pbw of aniline were added as the capping agent, and 168.2 pbw of BAPP were used. The results of this experiment are set forth in Tables 2-4.

TABLE 2

| | Capping Experiments - Preparation | | | | | | |
|---|---|---|---|---|---|---|---|
| Example No. | % Aniline | % TMA | % PA | Soln. Visc. Gardner-Holdt | RxIV[1] | Dried[2] Poly. IV | Cured[3] Poly. IV |
| 1 | — | 2 | — | Z5(−) | 0.36 | 0.67 | 1.04 |
| 2 | — | 4 | — | Z4 | 0.35 | 0.47 | 0.88 |
| 3 | — | — | 1 | Z5(−) | 0.37 | 0.73 | 1.39 |
| 4 | — | — | 3 | Z3(+) | 0.32 | 0.61 | 0.87 |
| 5 | — | — | 6 | Z4 | 0.32 | 0.51 | 0.67 |
| 6 | — | 7 | — | Z4(−) | 0.32 | 0.46 | 0.91 |
| 7 | 3 | — | — | Z5(−) | 0.31 | 0.55 | 0.70 |
| 8 | — | — | — | Z | 0.27 | 0.36 | 0.42 |
| 9 | 6 | — | 10 | Z1(+) | — | 0.43 | 0.45 |
| Control 6973-105[4] | — | — | — | Z5(+) | .25 | 0.77 | 1.58 |
| Control | — | — | — | Z5(−) | .25 | 0.50 | 0.74 |

TABLE 2-continued

| | | Capping Experiments - Preparation | | | | | |
|---|---|---|---|---|---|---|---|
| Example No. | % Aniline | % TMA | % PA | Soln. Visc. Gardner-Holdt | RxIV[1] | Dried[2] Poly. IV | Cured[3] Poly. IV |
| 6973-147[4] | | | | | | | |

[1] On polymer dried 16 hours @ 80-90° C. (22 mm Hg).
[2] 1 (above) after heating further 16 hours 180° C. (.2 mm Hg).
[3] 2 (above) after heating further 6 hours @ 400°-450° F.
[4] Stoichiometric Experiments.

TABLE 3

| Example No. | Capping Level | Mold Temp. | Ultimate Tensile Strength | Ultimate Elongation | Notched Izod |
|---|---|---|---|---|---|
| 1 | 2% TMA | 580° F. | 13,100 psi | 60% | 3.6 |
| 2 | 4% TMA | 560° F. | 13,400 psi | 59% | 2.7 |
| 3 | 1% PA | 580° F. | 13,700 psi | 65% | 4.2 |
| 4 | 3% PA | 560° F. | 13,300 psi | 65% | 2.8 |
| 5 | 6% PA | 550° F. | 12,700 psi | 45% | 1.7 |
| 6 | 7% TMA | 560° F. | 13,000 psi | 56% | 1.3 |
| 7 | 3% Aniline | 570° F. | 13,100 psi | 36% | 3.1 |
| 8 | 10% PA | — | | | |
| 9 | 6% Aniline | 510° F. | 12,300 psi | 26% | 0.2 |
| Control 6973-105 | 0 | 580° F. | 12,400 psi | 51% | — |
| Control 6973-147 | 0 | 560° F. | 13,200 psi | 57% | — |
| Ultem 1000[2] | — | 530° F. | 7,500 psi | 1.8% | 0.5 |
| PES 600P | — | 530° F. | 4,000 psi | 1.2% | 1.5 |

TABLE 4

| | | Melt Flow[1] Data | |
|---|---|---|---|
| Example No. | Capping Level | Melt Flow 510° F. | Melt Flow 560° F. |
| 1 | 2% TMA | 0 g/10 min. | <20 g/10 min. |
| 2 | 4% TMA | 5 g/10 min. | 52 g/10 min. |
| 3 | 1% PA | 0 g/10 min. | <5 g/10 min. |
| 4 | 3% PA | 7 g/10 min. | 71 g/10 min. |
| 5 | 6% PA | 20 g/10 min. | 200 g/10 min. |
| 6 | 7% TMA | 25 g/10 min. | 312 g/10 min. |
| 8 | 10% PA[2] | — | — |
| 9 | 6% Aniline | 14 g/10 min. | 142 g/10 min. |
| Control 6973-147 | 0 | 23 g/10 min. | 288 g/10 min. |
| Ultem 1000[3] | — | 68 g/10 min. | >>300 g/10 min. |
| PES 600P[4] | — | 64 g/10 min. | >>300 g/10 min. |

[1] Die - 1" × 5/16", ⅛" orifice, 5000 psi.
[2] Degraded.
[3] Defined in Table 3.
[4] Defined in Table 3.

EXAMPLE 10

Polymer Preparation

A process quite similar to the preparation in Example 1 was utilized. The 4TMAC was added to a solution of the diamine(s) (capping agent added where necessary) in N-methylpyrrolidone. After addition was complete, the 28% polymer solids solution was heated at 50° C. for one hour then precipitated (water). After thorough washing, the product was funnel dried (on a Buchner), vacuum oven dried (80° C. for approximately sixteen hours), then heated for six hours at 400°-450° F. Melt flow values (⅛" orifice, 5,000 psi on 1" ram, 540° F.), as well as compression molded plaques, were obtained from samples given a six-hour (400°-450° F.) heat-treatment cycle.

Homopolymer (with TMA)

An initial sample of bis[4-p-aminophenoxy)phenyl]-sulfone, hereinafter BAPS, received from Okahato Sangyo revealed a purity of 96.5%. The polyamide-imide had a tensile strength of 11,200 psi with an elongation (ultimate) of 5.29%. Evaluation of a second sample yielded ultimate tensile properties of 14,100 psi with an elongation of 34.0%. This data is similar to typical values found for the TMA/BAPP homopolymer, although the elongation value of 34.0% is lower than the 50-60% values seen for the BAPP system. However, due notice was taken of the 7.2 ft-lb notched Izod value received for the TMA/BAPS product (6973-191) as it was noticeably higher than the 4.2 ft-lb number generally seen for the BAPP polymer. Thermal aging (at 400° F. ) of the TMA/BAPS system [6973-106-low IV (0.37 dl/g), low tensile] revealed no loss in properties after 1000 hours. Tensile strength was 12,300 psi and the elongation was 7.2%. Glass transition temperature of the TMA/BAPS homopolymer was found to be dependent on polymer IV. Sample 106 with a cured IV of 0.37 dl/g showed a Tg of 237° C. while 8052-29 (IV-0.50 dl/g) gave 260° C., and 8052-36,37 showed 274° C. and 275° C., respectively. These latter values are considered very good.

Typical melt flow values generated at 540° F. (⅛" orifice) were less than 5 g/10 minutes indicating lower viscosity compared to the TMA/BAPP homopolymer (<30 g/10 minutes @ 510° F.).

A final homopolymer preparation (8052-37) was carried out using a sample of BAPS from Mitsui Toatsu. Purity of this diamine was 99+% and was reflected in the good polymer tensile strength (14,000 psi) and high (50.7%) elongation. The notched Izod of 5.43 ft-lbs substantiates the good toughness found for their BAPS/TMA system.

With the observation that approximately 40°-50° F. higher temperatures would be required to generate melt flow values for the BAPS/TMA homopolymer comparable to values found for the BAPP/TMA homopolymer, it became desirable to explore methods for increasing the polymer flow.

Capped Systems

Experiments within the BAPS/TMA study comprised the use of 2,2,4-trimethylhexamethylene diamine (TMHMDA) as the third monomer. Attention was turned to capping the BAPS/TMA homopolymer with selected monofunctional reactants (e.g., phthalic anhydride, aniline, and trimellitic anhydride). Due to the low polymer flow observed with the homopolymer, levels of capping agent were restricted to the 3-6% range. Table 5 exhibits the properties developed for each of the capped products (8052-44 through 55). The corresponding 6% PA BAPP/TMA capped product was the best candidate and scale-up gave mechanical and thermal properties as good as, or better than Ultem 1000. However, the cured IV of the 6% PA BAPP/TMA system (0.67 dl/g) was significantly higher than the IV of 8052-50 (0.46). Experiments 8052-53, 55 (6% TMA, 5% aniline, respectively) were compression moldable.

Better properties were found with the 3% PA (8052-44), 4% TMA (8052-45), and 3% aniline (8052-46) capped products. Tensile strengths were a respectable 12,500 psi-13,000 psi with elongations ranging from 23.4% to 37.9%. Izod values of 3.15 ft-lbs and 4.19 ft-lbs for runs 44 and 46, respectively, are quite good. The 1.21 ft-lbs value revealed for 8052-45 was somewhat surprising. Tensile properties are quite good for this 4% TMA capped product. It is rather interesting that the cured IV, melt flow, Tg of 45 are essentially identical to 42 (10% TMHMDA Copolymer), yet the 5.35 ft-lb Izod value seen for 42 is some 4.4 times higher compared to the 1.21 ft-lb value observed for run 45. Rather significant is the relative lack of change in polymer melt flow with capping level. Values ranged from 2.9 g/10 minutes to 19.1 g/10 minutes and fall in the range of values seen from the BAPS/TMA homopolymer.

Excellent properties were generated for the 3% aniline capped product.

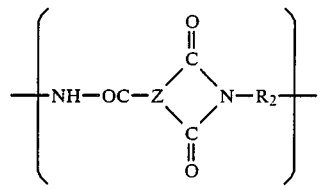

and of:

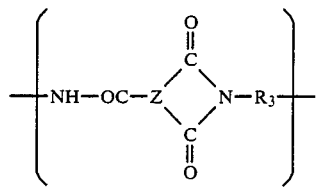

wherein one carbonyl group is meta to and one carbonyl group is para to each amide group and wherein Z is a trivalent benzene ring or lower-alkyl-substituted trivalent benzene ring, $R_1$, $R_2$ and $R_3$ are the same or different and are divalent aromatic or aliphatic radicals.

2. The polymer of claim 1 comprising about 1 to about 10 percent phthalic anhydride moieties.

3. The polymer of claim 2 comprising about 1 to about 8 percent phthalic anhydride moieties.

4. The polymer of claim 1 wherein $R_1$, $R_2$ and $R_3$ have the following structure:

TABLE 5

BAPS/TMA Capped Products

| Example | Mole Percent | | | Polymer IV (dl/g) | | | Melt Flow 540° F.(g/10 min) | Tens. Str. (Ultimate) | Elong. (Ultimate) | Tens. Str. (Yield) | Elong. (Yield) | Tg (°C.) | Notched Izod ft-lbs |
|---|---|---|---|---|---|---|---|---|---|---|---|---|---|
| | PA | TMA | AN | Initial | Dried | Cured | | | | | | | |
| A | 3 | | | 0.25 | 0.48 | 0.68 | 5.2 | 12,700 psi | 23.4% | 14,100 psi | 11.4% | 267 | 3.15 |
| B | | 4 | | 0.32 | 0.44 | 0.56 | 19.1 | 12,500 psi | 37.0% | 14,300 psi | 11.2% | 263 | 1.21 |
| C | | | 3 | 0.26 | 0.35 | 0.50 | 8.1 | 13,000 psi | 37.9% | 14,100 psi | 11.3% | 270 | 4.19 |
| D | 6 | | | 0.22 | 0.26 | 0.46 | 12.5 | — | — | — | — | — | — |
| E | | 6 | | 0.23 | 0.39 | 0.49 | 4.4 | 10,300 psi | 3.6% | | | — | 0.45 |
| F | | | 5 | 0.26 | 0.33 | 0.47 | 2.9 | 9,000 psi | 2.7% | — | — | — | 1.86 |

I claim:

1. An injection moldable polyamide-imide polymer comprising about 1 to about 10 percent phthalic anhydride moieties and recurring amide-imide moieties of:

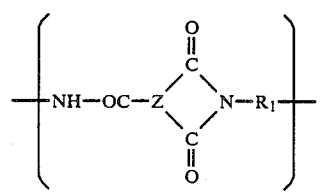

and of:

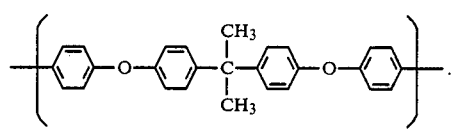

5. The polymer of claim 1 wherein $R_1$ and $R_2$ have the following structure:

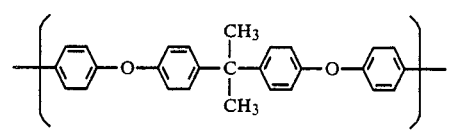

and $R_3$ is

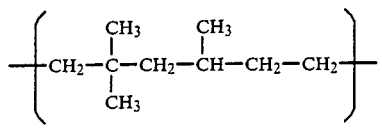

wherein the mole ratio of $R_3$ to both $R_1$ and $R_2$ is about 5:95 to about 30:70.

6. The polymer of claim 5 wherein the mole ratio of $R_3$ to both $R_1$ and $R_2$ is about 10:90 to about 20:80.

7. The polymer of claim 1 wherein $R_1$ and $R_2$ have the following structure:

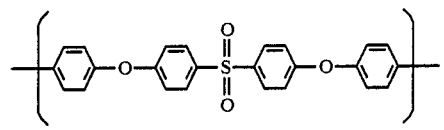

and $R_3$ is a divalent aliphatic hydrocarbon wherein the mole ratio of $R_3$ to both $R_1$ and $R_2$ is about 5:95 to about 30:70.

8. The polymer of claim 7 wherein $R_3$ is of the following structure:

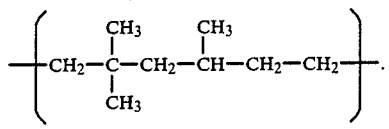

9. An injection moldable polyamide-imide polymer comprising about 1 to about 10 percent phthalic anhydride moieties and recurring amide-imide moieties of:

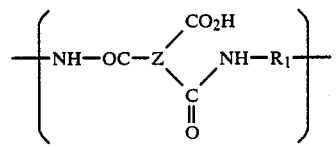

and of:

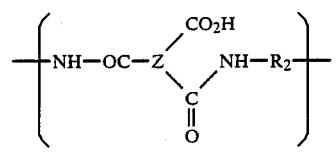

and of;

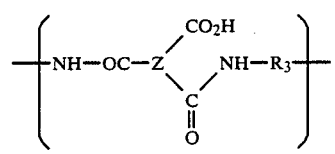

wherein one carbonyl group is meta to and one carbonyl group is para to each amide group and wherein Z is a trivalent benzene ring or lower-alkyl-substituted trivalent benzene ring, $R_1$, $R_2$ and $R_3$ are the same or different and are divalent aromatic or aliphatic radicals.

10. The polymer of claim 9 comprising about 1 to about 10 percent phthalic anhydride moieties.

11. The polymer of claim 10 comprising about 1 to about 8 percent phthalic anhydride moieties.

12. the polymer of claim 9 wherein $R_1$, $R_2$ and $R_3$ have the following structure:

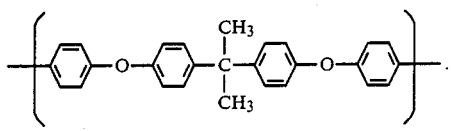

13. The polymer of claim 9 wherein $R_1$ and $R_2$ have the following structure:

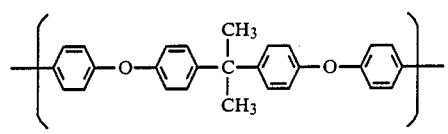

and $R_3$ is

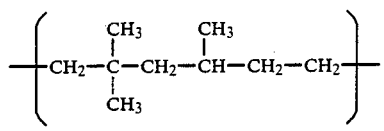

wherein the mole ratio of $R_3$ to both $R_1$ and $R_2$ is about 5:95 to about 30:70.

14. The polymer of claim 13 wherein the mole ratio of $R_3$ to both $R_1$ and $R_2$ is about 10:90 to about 20:80.

15. The polymer of claim 9 wherein $R_1$ and $R_2$ have the following structure:

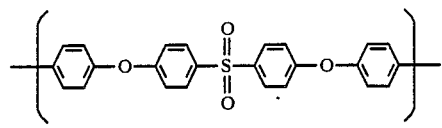

and $R_3$ is a divalent aliphatic hydrocarbon wherein the mole ratio of $R_3$ to both $R_1$ and $R_2$ is about 5:95 to about 30:70.

16. The polymer of claim 15 wherein $R_3$ is of the following structure:

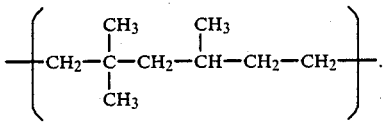

* * * * *